(12) United States Patent
Saida et al.

(10) Patent No.: US 8,620,551 B2
(45) Date of Patent: Dec. 31, 2013

(54) BICYCLE REGENERATIVE BRAKE CONTROL DEVICE

(75) Inventors: Takao Saida, Osaka (JP); Yusuke Nishikawa, Osaka (JP)

(73) Assignee: Shimano Inc., Osaka (JP)

( * ) Notice: Subject to any disclaimer, the term of this patent is extended or adjusted under 35 U.S.C. 154(b) by 210 days.

(21) Appl. No.: 13/206,563

(22) Filed: Aug. 10, 2011

(65) Prior Publication Data
US 2012/0053804 A1    Mar. 1, 2012

(30) Foreign Application Priority Data

Aug. 30, 2010  (JP) ................... 2010-192663

(51) Int. Cl.
*G06F 7/70* (2006.01)
(52) U.S. Cl.
USPC .............. 701/70; 701/71; 701/83; 318/376
(58) Field of Classification Search
USPC .......... 701/70, 71, 83; 303/137, 142; 318/376
See application file for complete search history.

(56) References Cited

U.S. PATENT DOCUMENTS

| | | |
|---|---|---|
| 2003/0047369 A1 | 3/2003 | Katagiri et al. |
| 2003/0169002 A1 | 9/2003 | Hughes |
| 2004/0084238 A1 | 5/2004 | Yokotani et al. |
| 2010/0252345 A1* | 10/2010 | Hoshino .................... 180/65.31 |

FOREIGN PATENT DOCUMENTS

| | | |
|---|---|---|
| EP | 2 067 694 A1 | 6/2009 |
| JP | 9-254861 A | 9/1997 |
| JP | 10-42537 A | 2/1998 |
| JP | 2000-6878 A | 1/2000 |
| JP | 2006-15887 A | 1/2006 |
| JP | 2010-35376 A | 2/2010 |

OTHER PUBLICATIONS

European Search Report of corresponding EP Application No. 11 16 5074.3 dated Nov. 24, 2011.

* cited by examiner

*Primary Examiner* — Gertrude Arthur Jeanglaude
(74) *Attorney, Agent, or Firm* — Global IP Counselors

(57) ABSTRACT

A bicycle regenerative brake control device basically includes a first displacement amount detecting part, a second displacement amount detecting part and a first control part. The first displacement amount detecting part is arranged to detect a first displacement amount a first brake system. The second displacement amount detecting part is arranged to detect a second displacement amount of a second brake system, which different from the first brake system. The first control part is configured to control a motor using a first control process in response to the first and second displacement amounts of the first and second brake systems such that the first control part generates a first regenerative braking force that corresponds with braking information obtained from the first displacement amount and the second displacement amount.

13 Claims, 10 Drawing Sheets

BICYCLE REGENERATIVE BRAKE CONTROL DEVICE

CROSS-REFERENCE TO RELATED APPLICATIONS

This application claims priority under 35 U.S.C. §119 to Japanese Patent Application No. 2010-192663, filed Aug. 30, 2010. The entire disclosure of Japanese Patent Application No. 2010-192663 is hereby incorporated herein by reference.

BACKGROUND

1. Field of the Invention

This invention generally relates to a brake control device. More specifically, the present invention relates to a brake system that can be mounted on an electric bicycle in which human-powered driving is assisted by a motor, and to a bicycle regenerative brake control device for controlling the motor.

2. Background Information

There are known in the art techniques for performing regenerative braking in order to suppress consumption of battery power in power-assisted bicycles in which human-powered driving is assisted by a motor (for example, see Japanese Laid-Open Patent Application No. 2010-35376). In a conventional regenerative brake device, a brake lever is provided with a sensor for detecting whether or not a lever has been operated. When the brake lever is operated, brake regeneration is performed, and regenerative charging is performed. Typically, a bicycle includes a first (front) brake system having a front brake lever and a second (rear) brake system having a rear brake lever, with a brake switch being arranged on each of the front and rear brake levers for detecting the presence or absence of lever operation. In conventional regenerative brake control devices, the regenerative braking force is smaller when only one of the brake switches is switched on than when both of the brake switches are switched on.

SUMMARY

In the conventional configuration described above, regenerative braking is performed using two regenerative braking forces whose strength varies between a case where only one of the brake levers is operated and a case where both of the brake levers are operated. Therefore, when a brake lever is operated, thereby launching the braking operation of a mechanical brake device of a bicycle, the braking force increases rapidly. When the braking force increases rapidly in relation to the amount of operation of the brake lever, there is a possibility of a sense of discrepancy occurring between regenerative braking and mechanical braking.

One aspect of the present disclosure is to provide a bicycle regenerative brake control device that is configured to reduce a likelihood of discomfort occurring between regenerative braking and mechanical braking.

In accordance with a first aspect of the present disclosure, a bicycle regenerative brake control device is proposed that basically comprises a first displacement amount detecting part, a second displacement amount detecting part and a first control part. The first displacement amount detecting part is arranged to detect a first displacement amount a first brake system. The second displacement amount detecting part is arranged to detect a second displacement amount of a second brake system, which different from the first brake system. The first control part is configured to control a motor using a first control process in response to the first and second displacement amounts of the first and second brake systems such that the first control part generates a first regenerative braking force that corresponds with braking information obtained from the first displacement amount and the second displacement amount.

In this regenerative braking control device of the first aspect, the first brake system and the second brake system, i.e., two (e.g., front and rear) mechanical brake mechanisms, undergo displacement, the motor is controlled so as to generate the first regenerative braking force that corresponds with braking information obtained from the first displacement amount and the second displacement amount.

According to the first aspect described above, when the first brake system and the second brake system undergo displacement, regenerative braking is performed by a first regenerative braking force that corresponds with braking information obtained from the first displacement amount and the second displacement amount. Therefore, the first regenerative braking force can be varied in correspondence with the displacement of the two mechanical brake systems, reducing the likelihood of discomfort occurring between regenerative braking and mechanical braking.

In accordance with a second aspect of the present disclosure, the bicycle regenerative brake control device of the first aspect is further configured such that the first control part is configured to obtain the braking information by adding the first displacement amount and the second displacement amount. In this case, since the braking information is obtained by adding the displacement of the first brake system and the second brake system, the likelihood of discomfort occurring between regenerative braking and mechanical braking is further reduced.

In accordance with a third aspect of the present disclosure, the bicycle regenerative brake control device of the first or second aspect is further configured such that the first control part is configured to control the motor such that the first control part generates the first regenerative braking force, which gradually increases in correspondence with an increase in the first and second displacement amounts. In this case, since the regenerative braking force increases gradually in correspondence with an increase in the displacement amount of the first brake system and the second brake system, the first regenerative braking force follows the braking state of the mechanical brake device. Therefore, the likelihood of discomfort occurring between regenerative braking and mechanical braking is further reduced.

In accordance with a fourth aspect of the present disclosure, the bicycle regenerative brake control device of the first through third aspects is further provided with a second control part configured to control the motor using a second control process such that the second control part generates a second regenerative braking force of a preset level upon determining is no displacement in either of the first brake system or the second brake system. In this case, regenerative charging, in which a second regenerative braking force of a preset level is generated, is performed by the second control part irrespective of the state of the first brake system and the second brake system, i.e., whether or not braking is being performed by the mechanical braking mechanisms. The second regenerative braking force is a braking force that is set to a level that does not adversely affect normal travel. Therefore, the charging amount becomes greater than regenerative charging by the second regenerative braking force.

In accordance with a fifth aspect of the present disclosure, the bicycle regenerative brake control device of the fourth aspect is further provided with a switch control part configured to switch from the second control process performed by the second control part to the first control process performed by the first control part upon determining at least one of the first and second brake systems undergoes displacement while the second control process is being performed by the second control part. In this case, even while regular regenerative braking performed by the second control part is being performed, when at least one of the first brake system and the second brake system undergoes displacement, i.e., brake operation is performed, the first control part performs regenerative braking that corresponds with braking information obtained from the first displacement amount and the second displacement amount. Therefore, even in a case in which regular regeneration is performed, brake operation increases the regenerative braking force, reducing the likelihood of discomfort occurring between regenerative braking and mechanical braking.

In accordance with a sixth aspect of the present disclosure, the bicycle regenerative brake control device of the fifth aspect is further configured such that the first control part generates the first regenerative braking force in a situation in which the switch control part switches from the second control process performed by the second control part to the first control process performed by the first control part, the first regenerative braking force being equal to or greater than the second regenerative braking force in correspondence with the braking information. In this case, it is possible to increase the first regenerative braking force from the second regenerative braking force used during regular regeneration, without causing discomfort.

In accordance with a seventh aspect of the present disclosure, the bicycle regenerative brake control device of the fifth or sixth aspect is further provided with a mode switch part configured to switch braking modes between a first regeneration mode and a second regeneration mode in response to a user input. The first regeneration mode uses the second control process while no displacement is determined in either of the first and second brake systems and uses the first control process while at least one of the first and second brake systems is determined to be undergoing displacement. The second regeneration mode prohibits uses of the second control process and only uses the first control process while at least one of the first and second brake systems is undergoing displacement. In this case, in the first regeneration mode, the second regenerative braking force is used to perform regular regenerative braking such that regenerative charging is performed while the first and second brake systems are not undergoing displacement, and the switch control part switches from a control performed by the second control part to a control performed by the first control part, such that the regenerative charging amount increases while at least one of the first and second brake systems is undergoing displacement. In the second regeneration mode, regenerative charging by the second control part is not performed, and when at least one of the first and second brake systems is undergoing displacement, braking is performed only using the first regenerative braking force to perform regenerative charging. Here, the charging amount can be adjusted to suit the preference of the rider. For example, it is possible, when the remaining battery level is low, for the first braking mode to be enabled and the charging amount increased, and when the remaining battery level is high, for the second braking mode to be enabled and for it to be made possible to pedal with less effort when the first brake system and second brake system is not operating.

In accordance with an eighth aspect of the present disclosure, the bicycle regenerative brake control device according to any of the first through seventh aspects is further configured such that the first control part controls the first regenerative braking force based on an output current of the motor that increases in correspondence with an increase in the first and second displacement amounts. In this case, the first regenerative braking force is controlled based on an electrical current that varies in correspondence with torque, therefore making it possible to inhibit a variation in the regenerative braking force, the regenerative braking force corresponding with the displacement amount, when the speed of the bicycle varies.

In accordance with a ninth aspect of the present disclosure, the bicycle regenerative brake control device according to the eighth aspect is further configured such that the first control part sets an upper limit of the first regenerative braking force based on a maximum output current that has been set in advance. In this case, it is possible to inhibit a variation in the upper limit of the first regenerative braking force, even when the speed of the bicycle varies.

In accordance with a tenth aspect of the present disclosure, the bicycle regenerative brake control device according to any of the first through ninth aspects is further configured such that each of the first brake system and the second brake system includes at least one of a brake lever, a brake wire, a caliper brake, a cantilever brake, a hydraulic brake, a brake shoe, a brake pad, and a roller brake. In this case, the regenerative braking force can be changed in correspondence with the displacement in a variety of types of devices relating to a brake.

Accordingly, when the first brake system and the second brake system undergo displacement, regenerative braking is performed by the first regenerative braking force that corresponds with braking information obtained from the first displacement amount and the second displacement amount. Therefore, it is possible to vary the first regenerative braking force in correspondence with the displacement of two mechanical brake systems, reducing the likelihood of discomfort occurring between regenerative braking and mechanical braking.

Various objects, features, aspects and advantages of the bicycle regenerative brake control device will become apparent to those skilled in the art from the following detailed description, which, taken in conjunction with the annexed drawings, discloses one illustrative embodiment of a bicycle regenerative brake control device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
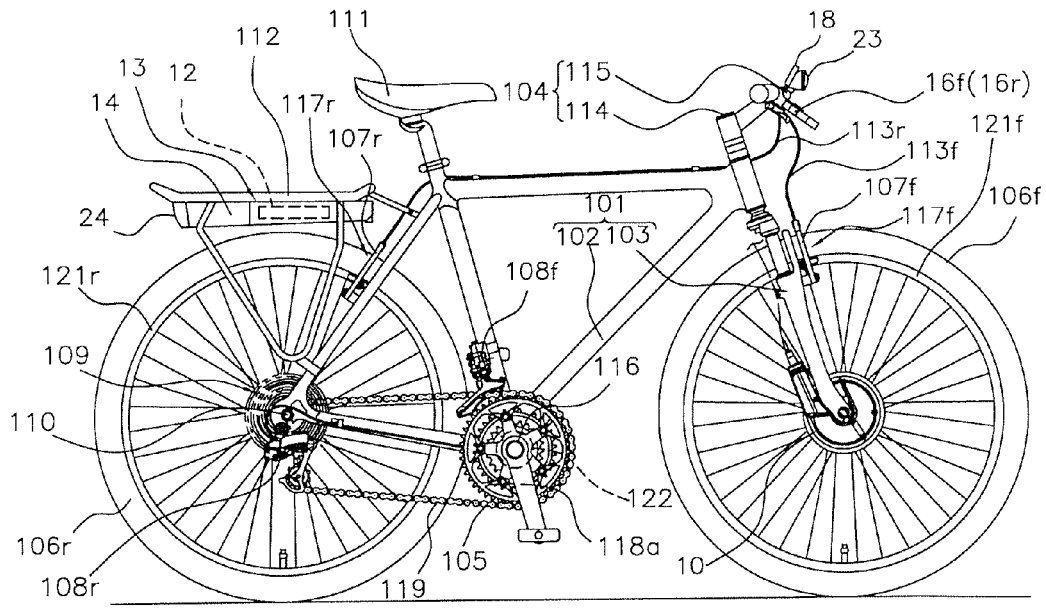
FIG. 1 is a right side elevational view of a bicycle that is equipped with a bicycle regenerative brake control device in accordance with one embodiment.
Figure 2:
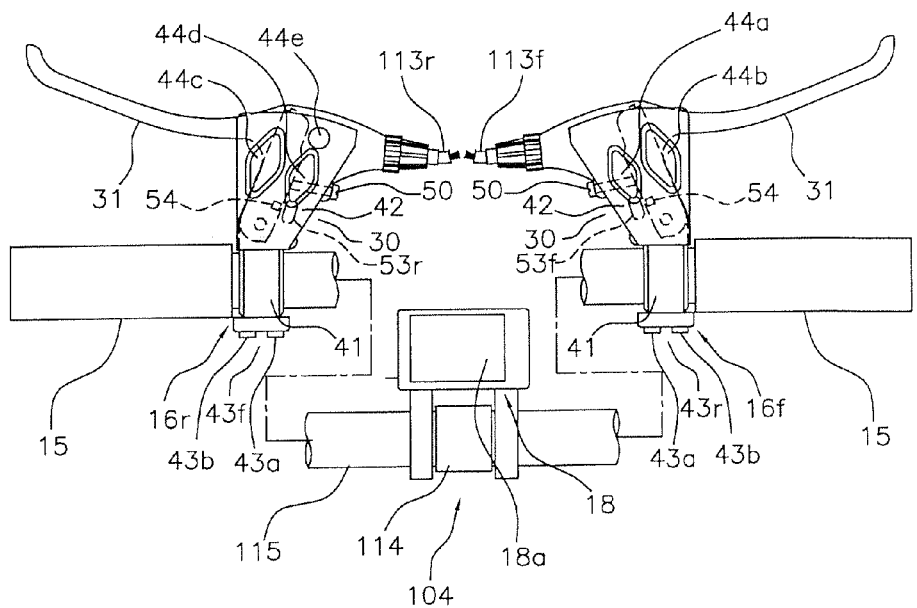
FIG. 2 is a top plan view of a front portion of the bicycle illustrated in FIG. 1 showing a pair of brake levers and a display device mounted to the handlebar.

Referring initially to FIGS. 1 and 2, a bicycle is illustrated which is equipped with a power-assisted bicycle in which human-powered driving is assisted by a motor-integrated hub or motor unit 10 in accordance with one illustrated embodiment. In the following description, the terms "left" and "right" of the bicycle are defined so that when the bicycle is viewed from the rear, the rightward direction is defined as the right, and the leftward direction is defined as the left.

The bicycle includes a frame 101 having a frame body 102 and a front fork 103 with a handle part 104. The bicycle further includes a drive part 105, a front wheel 106f, a rear wheel 106r, a front braking device 107f, a rear braking device 107r, a headlamp 23 and a tail light 24. The front fork 103 is mounted to a front part of the frame body 102 so as to pivot around an inclined axis. The front brake device 107f performs braking by coming into contact with and applying a braking force to a front rim 121f of the front wheel 106f. The rear brake device 107r performs braking by coming into contact with and applying a braking force to a rear rim 121r of the rear wheel 106r.

A variety of parts including a saddle 111 and the handle part 104 are attached to the frame 101. The drive part 105 includes a front derailleur 108f, a rear derailleur 108r and a gear set 109 mounted on a rear hub 110 of the rear wheel 106r. The drive part 105 also includes a crank shaft 116 supported by a hanger part of the frame body 102 in a rotatable manner. The drive part 105 further includes a gear crank 118a and a left crank (not shown) that are secured to both ends of the crank shaft 116. The drive part 105 has a chain 119 provided around the gear crank 118a and the gear set 109.

In the front derailleur 108f, the chain 119 is engaged around one of, e.g., three sprockets mounted on the gear crank 118a. In the rear derailleur 108r, the chain 119 is engaged around one of, e.g., nine sprockets of the gear set 109 attached to the rear hub 110. The front derailleur 108f and the rear derailleur 108r are both electrically driven.

A rear carrier 112 is attached to an upper rear part of the frame body 102. A rear carrier unit 13 is mounted on the rear carrier 112. The rear carrier unit 13 includes an overall control part 12. The rear carrier unit 13 is attachably/detachably equipped with a power-storing part 14 that functions as a power source for a motor unit 10 described further below. The rear carrier unit 13 is attachably/detachably equipped with the overall control part 12, the headlamp 23 and other components. The power-storing part 14 includes, e.g., a nickel hydrogen battery, a lithium ion battery, or another battery. The tail light 24 is integrally attached to the power-storing part 14.

Figure 5:
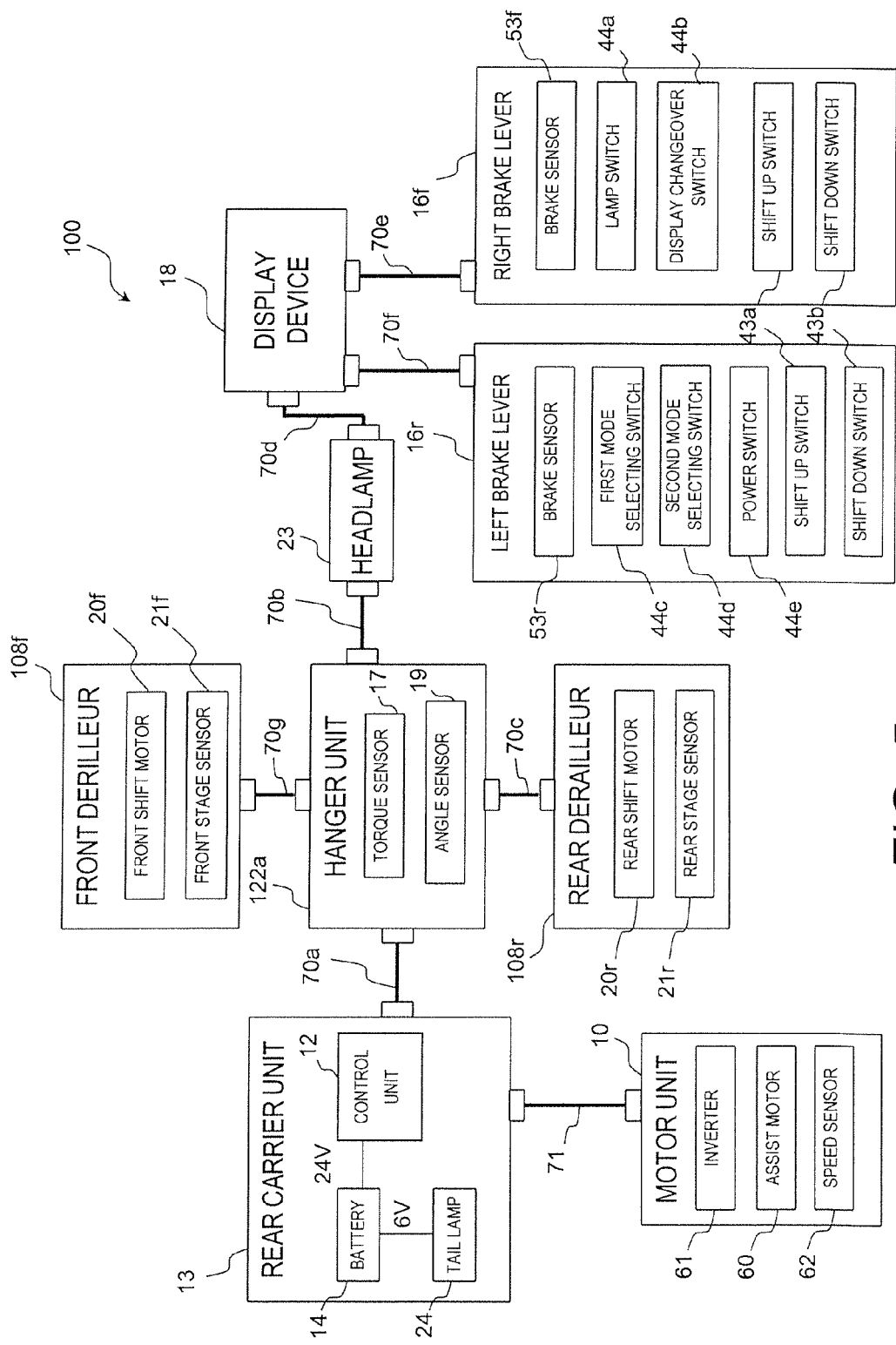
FIG. 5 is a schematic block diagram showing an entire configuration of an electrical system for the bicycle regenerative brake control device according to the first embodiment.

The motor unit 10 is mounted on the center of the front wheel 106f for assisting the driving of the front wheel 106f. As shown in FIG. 5, an assist motor 60, an inverter 61, and a speed sensor 62 are provided within the motor unit 10. The assist motor 60 is, e.g., a three-phase brushless DC motor or an AC motor. The inverter 61 converts a DC current outputted from the power-storing part 14 to an AC current for generating an assist force in accordance with the assist mode of the assist motor 60. The inverter 61 also changes the regenerative braking force of the assist motor 60. The inverter 61 varies the output current from the motor 60 according to the duty ratio to change the assist force and the regenerative braking force. The inverter 61 has an output current detecting part 61a for detecting the output current. The speed sensor 62 detects the speed of rotation of the assist motor 60, i.e., the speed of the bicycle.

As shown in FIG. 5, the hanger part 122 is provided with a hanger unit 122a. The hanger unit 122a includes a torque sensor 17 for detecting pedaling force acting on the crank shaft 116. The hanger unit 122a also includes an angle or rotational sensor 19 for detecting the rotation angle of the crank shaft 116.

The rear carrier unit 13 has the overall control part 12 provided within. The overall control part 12 includes a microcomputer, and controls electrical components that are connected. The overall control part 12 is capable of controlling the motor unit 10 so that an assist force of a maximum of N1 times larger than the pedaling force applied by the rider is generated. The overall control part 12 controls the assist motor 60 through a plurality of regenerative braking modes and a plurality of assist modes. Specifically, the overall control part 12 has three assist modes: a strong assist mode, in which assistance is provided by an assist force of N1 times the pedaling force; a medium assist mode, in which assistance is provided by an assist force of N2 times the pedaling force; and a weak assist mode, in which assistance is provided by an assist force of N3 times the pedaling force. The terms N1, N2, and N3 represent a predetermined number, selected so that N1 is larger than N2 and N2 is larger than N3. For example, 2 is selected as N1, 1.5 is selected as N2, and 1 is selected as N3.

Also with regards to regenerative braking modes, the overall control part 12 has two braking modes: a regular regeneration mode and a brake regeneration mode. The regular regeneration mode is an example of the first braking mode, while the brake regeneration mode is an example of the second braking mode. The brake regeneration mode is a mode in which the braking force is varied according to the movement position of a lever member 31 of a right brake lever 16f and/or a left brake lever 16r described further below. The overall control part 12 also has an operation mode of the motor unit 10 and a disabled mode in which neither assisting nor regenerative braking is performed. The assist modes include a strong assist mode, a medium assist mode, and a low assist mode.

The operation modes of the motor unit 10 also include a disabled mode in which neither assisting nor regenerative braking is performed. In the regular regeneration mode, when the respective lever member 31 of the right brake lever 16f and the left brake lever 16r moves from an initial position (i.e., a release position), braking is performed using the second regenerative braking force of a preset level until a predetermined position is reached. When the predetermined position is exceeded, braking is performed using the first regenerative braking force, in which the braking force generated by regenerative braking is equal to or greater than the second regenerative braking force in correspondence with the movement position of the lever member 31. The predetermined position is a movement position that corresponds with a swing movement of about 3° from the release position of the lever member 31. In the regular regeneration mode, when the lever member 31 of the right brake lever 16f is moved from the initial position, a control is performed by the uniform first regenerative braking force until the predetermined position is reached. When the predetermined position is exceeded, a control is performed by the second regenerative braking force, in which the braking force by regenerative braking increases according to the movement position of the lever member 31. In the brake regeneration mode, no regular regeneration is performed, and control is performed by the second regenerative braking force according to the movement position of the lever member 31 of the right brake lever 16f and the left brake lever 16r, respectively. In the regular regeneration and the brake regeneration braking modes, braking is applied to the front wheel 106f while electrical power generated in the assist motor 60 is stored in the power-storing part 14.

The handle part 104 includes a handle stem 114 secured to an upper part of the front fork 103, and a bar-handle-shaped handlebar 115 secured to the handle stem 114. As shown in FIG. 2, which shows the handle part 104 as viewed from above, a right brake lever 16f, a left brake lever 16r, and a grip 15 are provided to ends of the handlebar 115. A display part 18 is secured to a center part of the handlebar 115 so as to straddle the handle stem 114.

The display part 18 includes a liquid crystal display screen 18a. The liquid crystal display screen 18a can be switched between, e.g., an assist screen shown in FIG. 3 for displaying, e.g., a screen for selecting between assist or regenerative braking modes, and a cycle computer screen shown in FIG. 4 for displaying the speed of the bicycle, the shift position of the front derailleur 108f and the rear derailleur 108r, travel distance, and other information. Both screens show the remaining battery level in the power-storing part 14. In the assist screen shown in FIG. 3, it is possible to select, for example, two regenerative braking modes and three assist modes, as well as a disabled mode in which neither assisting nor regenerative braking is performed. When an up mode selection switch 44c or a down mode selection switch 44d described further below is operated, a cursor moves up or down. Then, when no switch is operated for more than several seconds, the mode corresponding to the cursor position is selected. The cursor also becomes stationary at the selected mode.

Figure 3:
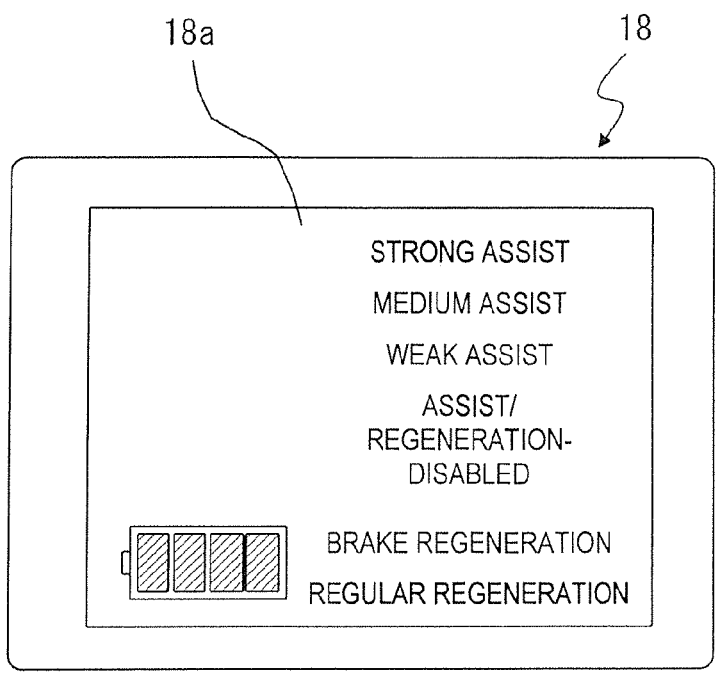
FIG. 3 is a diagrammatic drawing showing an example of a mode screen being displayed on the display device.

In the assist screen shown in FIG. 3, the assist mode is set to the strong assist mode, and the regenerative braking mode is set to the regular regeneration mode. Therefore, in a circumstance in which the assist mode and the regenerative braking mode have been selected, two cursors are displayed. However, in a circumstance in which the assist/regeneration-disabled mode is selected, the assist/regeneration-disabled mode is indicated by the cursor.

Also, on the cycle computer screen, the cursor for the shift position shows the current shift position.

The right brake lever 16f is connected to the front brake device 107f by a front brake cable 113f. The left brake lever 16r is connected to the rear brake device 107r by a rear brake cable 113r. A brake wire connects the right brake lever 16f and the front brake device 107f together to form a front brake mechanism 117f. The front brake system 117f is an example of the first brake system. Also, a brake wire connects the left brake lever 16r, the rear brake device 107r together to form a rear brake system 117r. The rear brake system 117r is an example of the second brake system. Each of the right brake lever 16f and the left brake lever 16r includes a mounting bracket 30 that is detachably mounted on the handlebar 115, and the lever member 31 that is swingably mounted on the mounting bracket 30.

As shown in FIG. 2, the mounting bracket 30 includes a mounting part 41 arranged at the lower portion of FIG. 2 so as to be mountable on the handlebar 115, and a bracket part 42 connected to the mounting part 41. The mounting part 41 can be used to secure the mounting bracket 30 to the handlebar 115 by tightening a fixing screw (not shown). A rear shift control part 43r and a front shift control part 43f are attached to the bracket part 42 of the right brake lever 16f and the left brake lever 16r for shift operation in the rear derailleur 108r and the front derailleur 108f so as to be capable of being individually attached or detached.

Each of the rear shift control part 43r and the front shift control part 43f includes a shift-up switch 43a and a shift-down switch 43b arranged, e.g., next to each other in a lateral direction. For example, the shift-up switch 43a is arranged further inward relative to the shift-down switch 43b, e.g., to the left of the shift-down switch 43b in the lateral direction of the bicycle. The shift-up switch 43a is a switch for shifting to a higher-speed shift stage, and the shift-down switch 43b is a switch for shifting to a lower-speed shift stage. For example, operating the shift-up switch 43a of the front shift control part 43f shifts the chain 119 in the gear crank 118a from a sprocket that has the smallest diameter to a sprocket that has a medium diameter, or from the sprocket that has the medium diameter to a sprocket that has the largest diameter. Also, operating the shift-up switch 43a of the rear shift control part 43r shifts the chain 119 in the small gear 109 to a sprocket that is one step smaller in diameter than the sprocket around which the chain 119 is engaged. An opposite operation is performed when the shift-down switch 43b is operated.

A lamp switch 44a and a display changeover switch 44b are arranged next to each other in the lateral direction on the bracket part 42 of the right brake lever 16f. The display changeover switch 44b is a switch for switching the liquid crystal display screen 18a of the display part 18 between the assist screen and the cycle computer screen. The lamp switch 44a is a switch for switching the forward-illuminating light 23 on or off. Each time the lamp switch 44a is operated by pressing, the headlamp 23 switches on or off Each time the display changeover switch 44b is operated by being pressed, the liquid crystal display screen 18a of the display part 18 is switched between the assist screen and the cycle computer screen.

The up mode selection switch 44c, the down mode selection switch 44d, and a power switch 44e are arranged on the bracket part 42 of the left brake lever 16r. The up mode selection switch 44c is a switch for selecting the regenerative braking mode and the assist mode in sequence in the upward direction of the screen shown in FIG. 3. The down mode selection switch 44d is a switch for selecting a plurality of regenerative braking modes or a plurality of assist modes in sequence in the downward direction of the screen shown in FIG. 3. The power switch 44e is a circular press-button switch arranged further upward of the down mode selection switch 44d in FIG. 2, and is a software switch for switching the power of the overall control part 12 on or off. Each time the up mode selection switch 44c is pressed, a cursor for selecting the regenerative braking control part or the assist mode moves in sequence in the upward direction of the screen. When the cursor stops moving, the corresponding mode will be selected. The down mode selection switch 44*d* similarly moves the cursor in sequence downwards. Although in the drawing, the modes displayed on the display screen are arranged in the vertical direction, the modes may also be displayed so as to be arranged in the lateral direction. Each time the power switch 44*e* is operated by being pressed, the power of the overall control part 12 is switched on or off.

The bracket part 42 is provided with an initial position adjusting part 50 having an adjusting bolt capable of adjusting the initial position of the lever member 31. A right brake sensor 53*f* is used is provided within the bracket part 42 of the front brake system 117*f*. The right brake sensor 53*f* includes a linear Hall element 55 that is used for detecting a distance relative to a magnet 54 embedded in the lever member 31, such that the movement position of the lever member 31 can be detected from the initial position. When the brake regeneration mode and the regular regeneration mode have been selected, the overall control part 12 performs regenerative braking control according to the movement position. A left brake sensor 53*r* is used is provided within the bracket part 42 of the rear brake system 117*r*. The left brake sensor 53*r* also includes a linear Hall element 55 that is used for detecting a distance relative to a magnet 54 embedded in the lever member 31, such that the movement position of the lever member 31 can be detected from the initial position. When the brake regeneration mode and the regular regeneration mode have been selected, the overall control part 12 performs regenerative braking control according to the movement position. The right brake sensor 53*f* is an example of the first displacement amount detecting part, and the left brake sensor 53*r* is an example of the second displacement amount detecting part.

The lever member 31 is mounted on the bracket part 42 so as to be capable of swinging between the initial position (i.e., the release position) and a maximum swing position. The initial position is the position at which the lever member 31 is the furthest from the handlebar 115. The lever member 31 is urged towards the initial position by an urging member (not shown) or a brake wire. The initial position can be adjusted by the initial position adjusting part 50 as described further above. An inner cable of the front brake cable 113*f* (or the rear brake cable 113*r*) is latched onto the lever member 31. An outer casing of the front brake cable 113*f* (or the rear brake cable 113*r*) is latched onto the bracket part 42.

Figure 6:
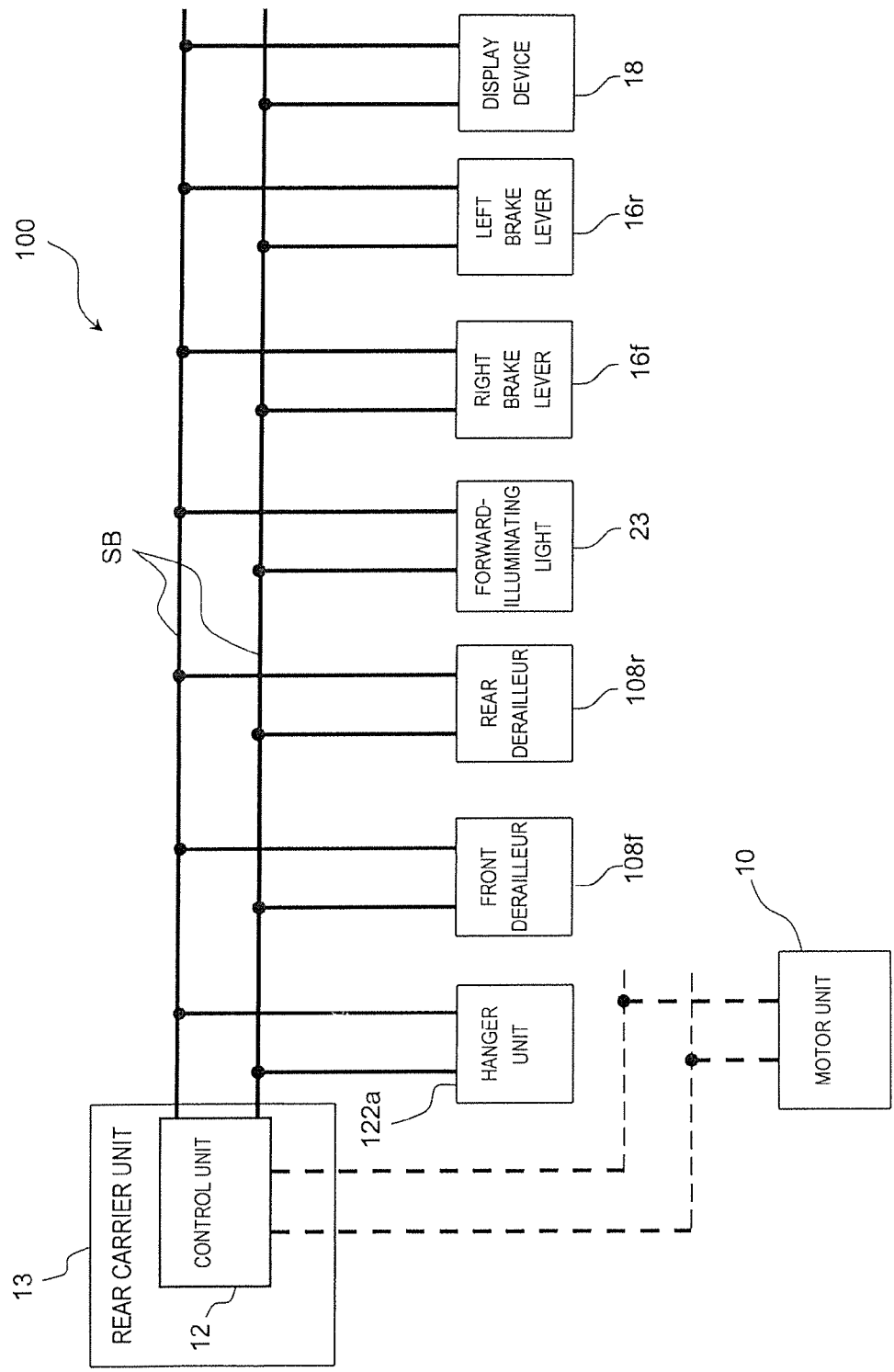
FIG. 6 is a schematic block diagram showing an electrical connection scheme or connection of the bicycle electrical system for the control part or unit of the bicycle regenerative brake control device.

As shown in FIGS. 5 and 6, an electrical system 100 to be installed on a bicycle includes, as electrical components, the rear carrier unit 13, the motor unit 10, the hanger unit 122*a*, the front derailleur 108*f* and the rear derailleur 108*r*, the forward-illuminating light 23, the display part 18, and the right brake lever 16*f* and the left brake lever 16*r*. The electrical components are connected by first power lines 70*a* through 70*g* and a second power line 71, through which communication can be transmitted. In FIG. 5, each of the first power lines 70*a* through 70*g* is represented by a solid line, and the second power line 71 is represented by a line that is thicker than the lines representing the first power lines 70*a* through 70*g*. The first power lines 70*a* through 70*g* and the second power line 71 are formed so as to include two conducting wires. One of the two wires is a ground wire.

The rear carrier unit 13 includes the overall control part 12 for controlling the electrical components of the electrical system 100, the power-storing part 14, and the rear light 24. The rear carrier unit 13 is mounted on the rear carrier 112. The overall control part 12 comprises a microcomputer. The power-storing part 14, which is a power source for the electrical system 100, is detachably mounted on the overall control part 12. The rear light 24 is integrally attached to the power-storing part 14.

The motor unit 10 is connected to the rear carrier unit 13 with the second power line 71 interposed therebetween. The second power line 71 is a power line through which a supply current from e.g., a 24 V voltage source can be passed. The first power lines 70*a* through 70*g* are power lines through which a supply current from, e.g., a 6V voltage source can be passed.

A supply current superimposed with a control signal for controlling respective corresponding electrical components flows through the first power lines 70*a* through 70*g* and the second power line 71.

The hanger unit 122*a* is connected to the rear carrier unit 13 with the first power line 70*a* interposed therebetween. As described further above, the hanger unit 122*a* includes the torque sensor 17 and the angle sensor 19. The headlamp 23, the front derailleur 108*f*, and the rear derailleur 108*r* are individually connected to the hanger unit 122*a* with the first power line 70*b*, the first power line 70*g*, and the first power line 70*c* respectively interposed therebetween. The headlamp 23 is, e.g., a power-saving type in which an LED (i.e., a light-emitting element) is used. The headlamp 23 is mounted on a front surface of the front fork 103.

The front derailleur 108*f* includes a front shift motor 20*f* and a front stage sensor 21*f*. The rear derailleur 108*r* includes a rear shift motor 20*r* and a rear stage sensor 21*r*, respectively. Each of the front derailleur 108*f* and the rear derailleur 108*r* respectively includes a front control part and a rear control part (not shown), for controlling the shift motor 20*f* and the rear shift motor 20*r* respectively. Output from the front stage sensor 21*f* and the rear stage sensor 21*r* respectively causes the shift stage of the front derailleur 108*f* and the rear derailleur 108*r* to be displayed on the display part 18. The display part 18 is connected to the headlamp 23 with the first power line 70*d* interposed therebetween.

The right brake lever 16*f* and the left brake lever 16*r* are connected to the display part 18 with the first power line 70*e* and the first power line 70*f* respectively interposed therebetween.

As shown in FIG. 6, each of the electrical components is connected in a serial bus structure. The electrical system 100 is thereby capable of operating whether or not any of the electrical components are connected, with the exception of electrical item in which the overall control part 12 is installed (e.g., the rear carrier unit 13). For example, in FIG. 6, even if the headlamp 23 is removed, if the first power line 70*b* is connected to the display part 18, the electrical system 100 will operate. Also, in a circumstance in which the front derailleur 108*f* and the rear derailleur 108*r* operate using a regular shift cable, the first power line 70*g* and the first power line 70*c* are removed. Similarly, in such a circumstance, the electrical system 100 will operate.

Figure 7:
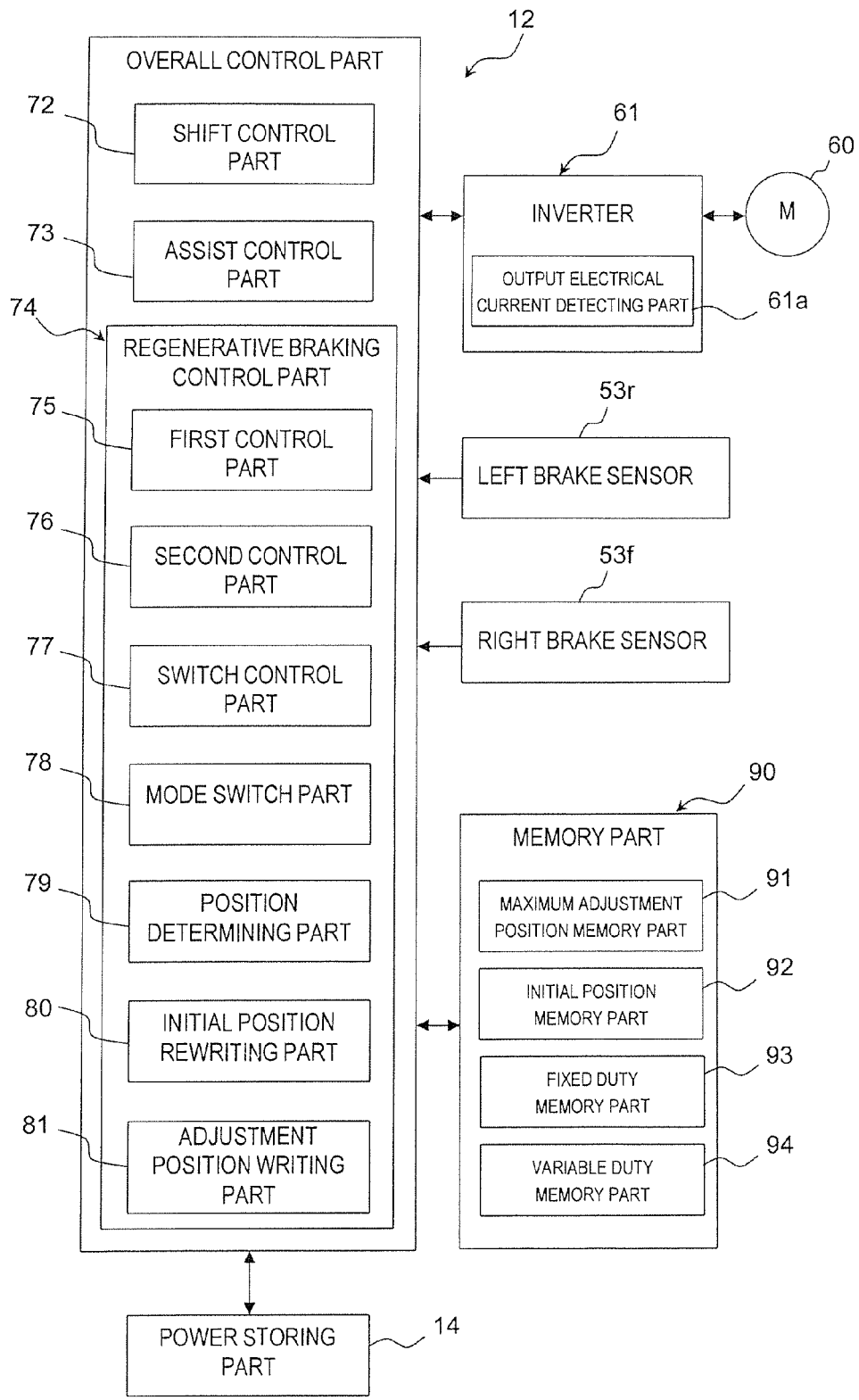
FIG. 7 is a schematic block diagram showing a configuration of functions of an overall control part of the bicycle regenerative brake control device.

As shown in FIG. 7, the overall control part 12 includes, as a configuration of functions obtained using software, a shift control part 72, an assist control part 73, and a regenerative braking control part (i.e., an example of a regenerative braking control device) 74. The regenerative braking control part 74 includes a first control part 75, a second control part 76, a switch control part 77, a mode switch part 78, a position determining part 79, an initial position rewriting part 80, and an adjustment position writing part 81. A memory part 90, in addition to the power-storing part 14, the motor unit 10, and other electrical components described further above, is connected to the overall control part 12. The memory part 90 includes, e.g., an electrically erasable programmable read only memory (EEPROM), a flash memory, or another non-volatile memory element; and has a maximum adjustment position memory part 91, an initial position memory part 92, a fixed duty memory part 93, and a variable duty memory part 94.

A right movement position Mf of the right brake lever 16*f* corresponding to a maximum initial position that has been adjusted using the initial position adjusting part 50 is stored in the maximum adjustment position memory part 91 as a right maximum adjustment position MAf. A left movement position Mr of the left brake lever 16*r* corresponding to a maximum initial position that has been adjusted using the initial position adjusting part 50 is stored in the maximum adjustment position memory part 91 as a left maximum adjustment position MAr. This storage process may be performed during factory shipment, or may be performed by the retailer or the rider.

In a circumstance in which the right initial position IMf of the right brake lever 16*f* has been modified, the right initial position IMf that has been modified using a regenerative braking mode process described further below is stored in the initial position memory part 92. When the bicycle is first purchased, the first right initial position IMf is a position that has not yet been adjusted by the initial position adjusting part 50. In a circumstance in which the right movement position is represented numerically, the right initial position IMf corresponds to e.g., a movement position of "0."

In a circumstance in which the left initial position IMr of the left brake lever 16*r* has been modified, the left initial position IMr that has been modified using a regenerative braking mode process described further below is stored in the initial position memory part 92. When the bicycle is first purchased, the first left initial position IMr is a position that has not yet been adjusted by the initial position adjusting part 50. In a circumstance in which the left movement position is represented numerically, the left initial position IMr corresponds to e.g., a movement position of "0."

A fixed target current value FAM is stored in the fixed current value memory part 93. The fixed target current value FAM is used for generating the first regenerative braking force BF1 which is used while the regular regeneration mode is engaged. A first variable target current value CAMa is stored in the variable current value memory part 94. The first variable target current value CAMa is used for generating the second regenerative braking force BF2, which gradually increases in correspondence with an added movement position M (i.e., an example of braking information) during brake regeneration. The added movement position M is obtained by adding the values of the right movement position Mf and the left movement position Mr, relative to the initial position, for each of the lever members 31 of the right brake lever 16*f* and the left brake lever 16*r*. A second variable target current value CAMb is also stored in the variable current value memory part 94. The second variable target current value CAMb is used for generating the first regenerative braking force BF1, which gradually increases in correspondence with the added movement position M when the regular regeneration mode is enabled in a manner similar to when the brake regeneration mode is enabled. The first variable target current value CAMa and the second variable target current value CAMb are calculated for each added movement position M based, e.g., on a function f(M) of the added movement position M. The calculation results are stored in table format in the variable current value memory part 94. Therefore, using an added movement position M, it is possible to read the first variable target current value CAMa and the second variable target current value CAMb at the corresponding position. In the regular regeneration mode and the brake regeneration mode, the regenerative braking control part 74 performs feedback control on the motor 60 according to the duty ratio so that the target current values described above are obtained at a predetermined timing for each added movement position M.

Figure 11:
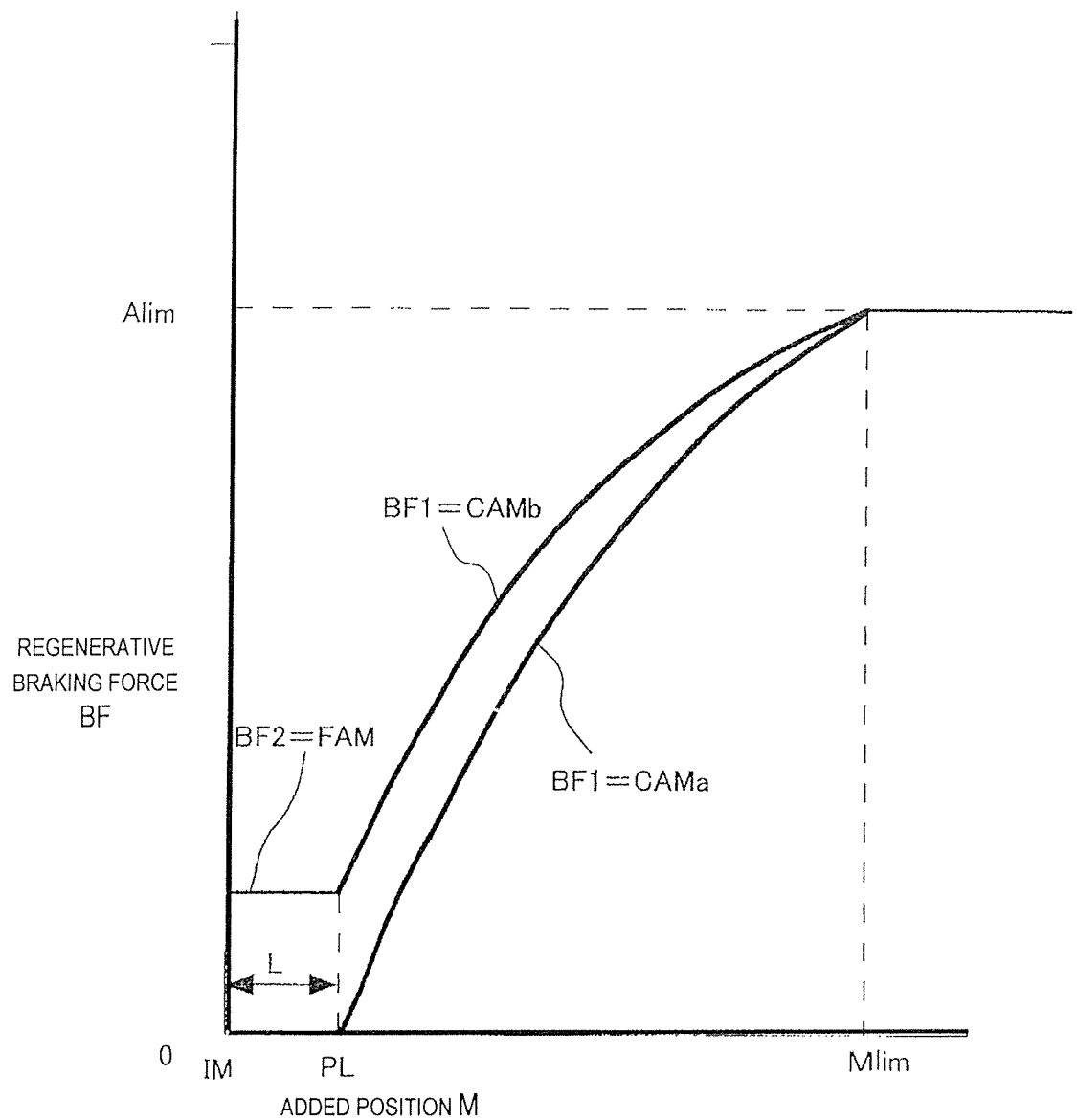
FIG. 11 is a graph showing a change in the regenerative braking force during brake regeneration and during regular regeneration.

As shown in FIG. 11, the first variable target current value CAMa and the second variable target current value CAMb gradually increase from the predetermined position PL to the maximum output current Alim, which represents an upper limit. The length L between the initial position MI and the predetermined position PL allows for any looseness of the lever member 31 of the right brake lever 16*f* or the left brake lever 16*r*. The maximum output current Alim, which represents the upper limit, is a current value that is lower than the maximum allowable output current value. An upper limit added movement position Mlim, at which the maximum output current Alim is generated, is at a preset level. For example, the upper limit added movement position Mlim is preferably set at a position that is slightly before a position at which the front brake device 107*f* and the rear brake device 107*r* commence braking operation, i.e., before the brake shoe comes into contact with the rim.

The first variable target current value CAMa gradually increases from zero. The second variable target current value CAMb gradually increases from the fixed target current value FAM, which is equivalent to the second regenerative braking force BF2. The curves shown in FIG. 11 to represent the first variable target current value CAMa and the second variable target current value CAMb are curves whose respective rate of increase falls in correspondence with, e.g., an increase in the added movement position M. However, the configuration of the increase in the variable target current value is not limited to that shown. The curves may be ones whose rate of increase grows in correspondence with the increase in the added movement position M, or ones whose rate of increase fluctuates. A straight line, whose rate of increase does not vary, is also possible.

Figure 12:
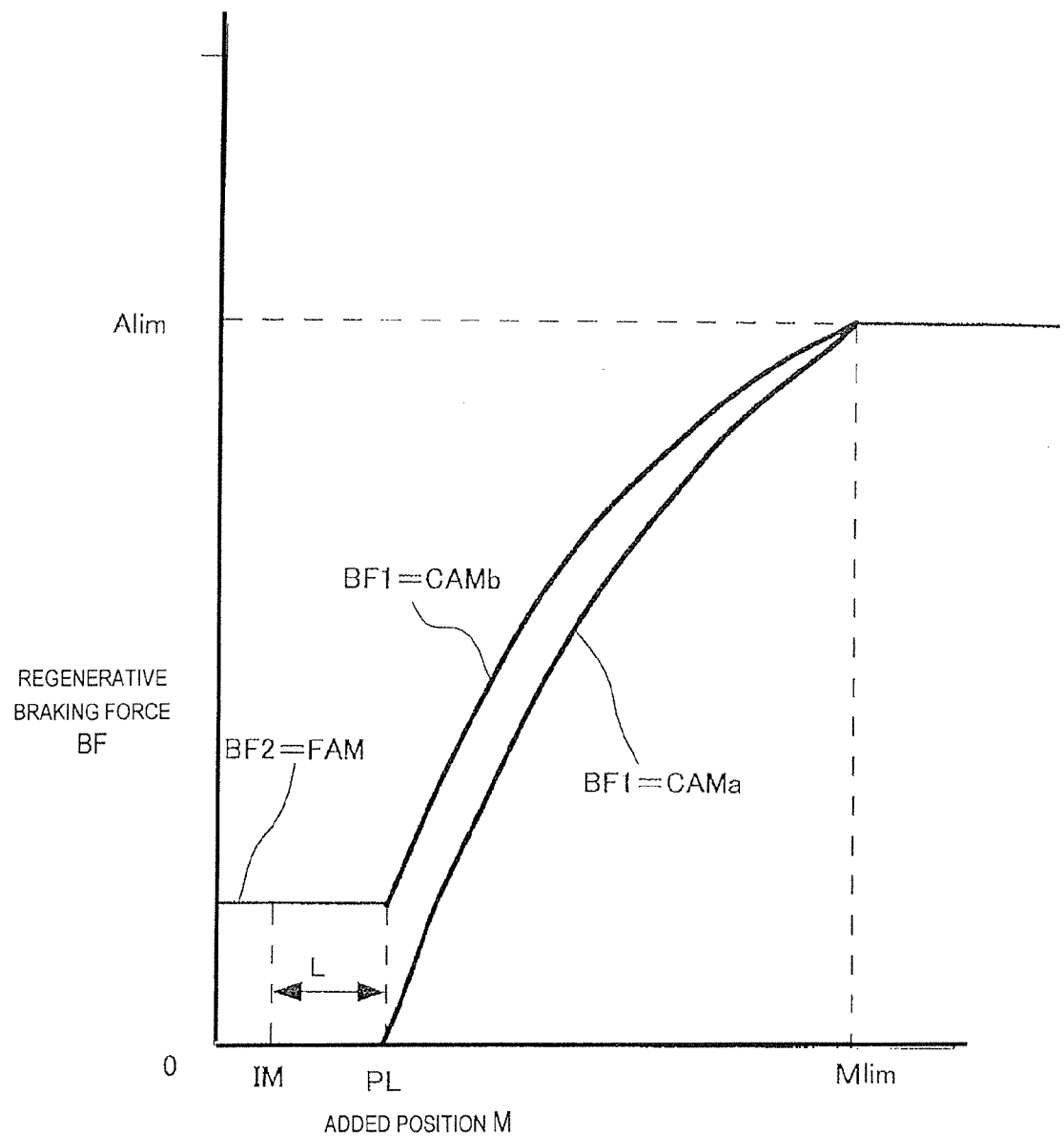
FIG. 12 is a graph, similar to FIG. 11, showing a change in the regenerative braking force during brake regeneration and during regular regeneration, bit in a situation in which the initial position has been changed.

When the initial position IM varies, the predetermined position PL, which represents a base point from which the first variable target current value CAMa and the second variable target current value CAMb stored in the variable current value memory part 94 start to increase, shifts by a corresponding amount as shown in FIG. 12. However, the upper limit added movement position Mlim at which the maximum output current Alim, i.e., the maximum first regenerative braking force, is generated, does not vary, even when the initial position IM varies.

Therefore, when the initial position MI varies, the respective rate of increase of the first variable target current value CAMa and the second variable target current value CAMb varies. Therefore, each time at least one of a right initial position IMf and a left initial position IMr is modified, content stored in the variable current value memory part 94 is renewed.

The shift control part 72 controls the shift stages of the front derailleur 108*f* and the rear derailleur 108*r* according to operation of the left and right shift-up switches 43*a* and the left and right shift-down switches 43*b*. The assist control part 73 controls the motor 60 via the inverter 61 in an assist mode selected using the up mode selection switch 44*c* and the down mode selection switch 44*d*. The regenerative braking control part 74 controls the motor 60 via the inverter 61, according to the regenerative braking mode that has been selected using an up mode selection switch 44*c* and a down mode selection switch 44*d*.

A first control part 75 controls the motor 60 so as to generate the first regenerative braking force, which gradually increases, when the front brake system 117f and the rear brake system 117r shift from an initial state to a braking state. Specifically, when at least one of the lever member 31 of the right brake lever 16f and the lever member 31 of the left brake lever 16r moves from its respective right initial position IMf or the left initial position IMr, the first control part 75 controls the motor 60 so as to generate the first regenerative braking force BF1, which gradually increases in correspondence with the resulting added movement position M. As described further above, in FIG. 11, the second regenerative braking force BF2 generated by the motor 60 as a result of control performed by a second control part 76 is of a preset level. The first regenerative braking force BF1 generated by the motor 60 as a result of control performed by the first control part 75 is represented by, e.g., the function f(M) of the added movement position M, and gradually increases as the added movement position M increases. If the lever member 31 moves from the initial position beyond the predetermined position when a control by the first control part 76 is being performed in the regular regeneration mode, the switch control part 77 switches to a control performed by the second control part 75. The mode switch part 78 can be used to manually switch the regenerative braking mode between either the regular regeneration mode (a first regeneration mode), or the brake regeneration mode (a second regeneration mode). Specifically, the mode switch part 78 activates the regenerative braking mode that has been selected by the rider using the up mode selection switch 44c and the down mode selection switch 44d. The position determining part 79 determines whether the movement position of the lever member 31 from the initial position IM has exceeded the predetermined position PL.

When the initial position adjusting part 50 is used to modify the right initial position IMf, the initial position rewriting part 80 rewrites information stored in the initial position memory part 92 with a movement position after adjustment. In this case, when the linear Hall element 55 of the right brake lever 16f detects a movement position that is smaller than the right maximum adjustment position MAf, the initial position rewriting part 80 stores this movement position in the initial position memory part 92 as the right initial position IMf, and rewrites the initial position. When the initial position adjusting part 50 is used to modify the left initial position IMr, the initial position rewriting part 80 rewrites information stored in the initial position memory part 92 with a movement position after adjustment. Specifically, when the linear Hall element 55 detects a movement position that is smaller than the maximum adjustment position, the initial position rewriting part 80 stores the movement position in the initial position memory part 92 as an initial position, and rewrites the initial position.

When the initial position is modified, the first variable target current value CAMa and the second variable target current value CAMb are renewed as described further above. When, e.g., the initial position adjusting part 50 is used to adjust the maximum initial position, the adjustment position writing part 81 stores, as the right maximum adjustment position MAf, the right movement position Mf when one of the switches 44a through 44e is pressed and held for, e.g., two seconds or more; or two or more switches are operated simultaneously; or a similar operation is performed, in the maximum adjustment position memory part 91. The adjustment position writing part 81 also stores, as the left maximum adjustment position MAr, the left movement position Mr when the operation described above is performed, in the maximum adjustment position memory part 91.

Figure 8:
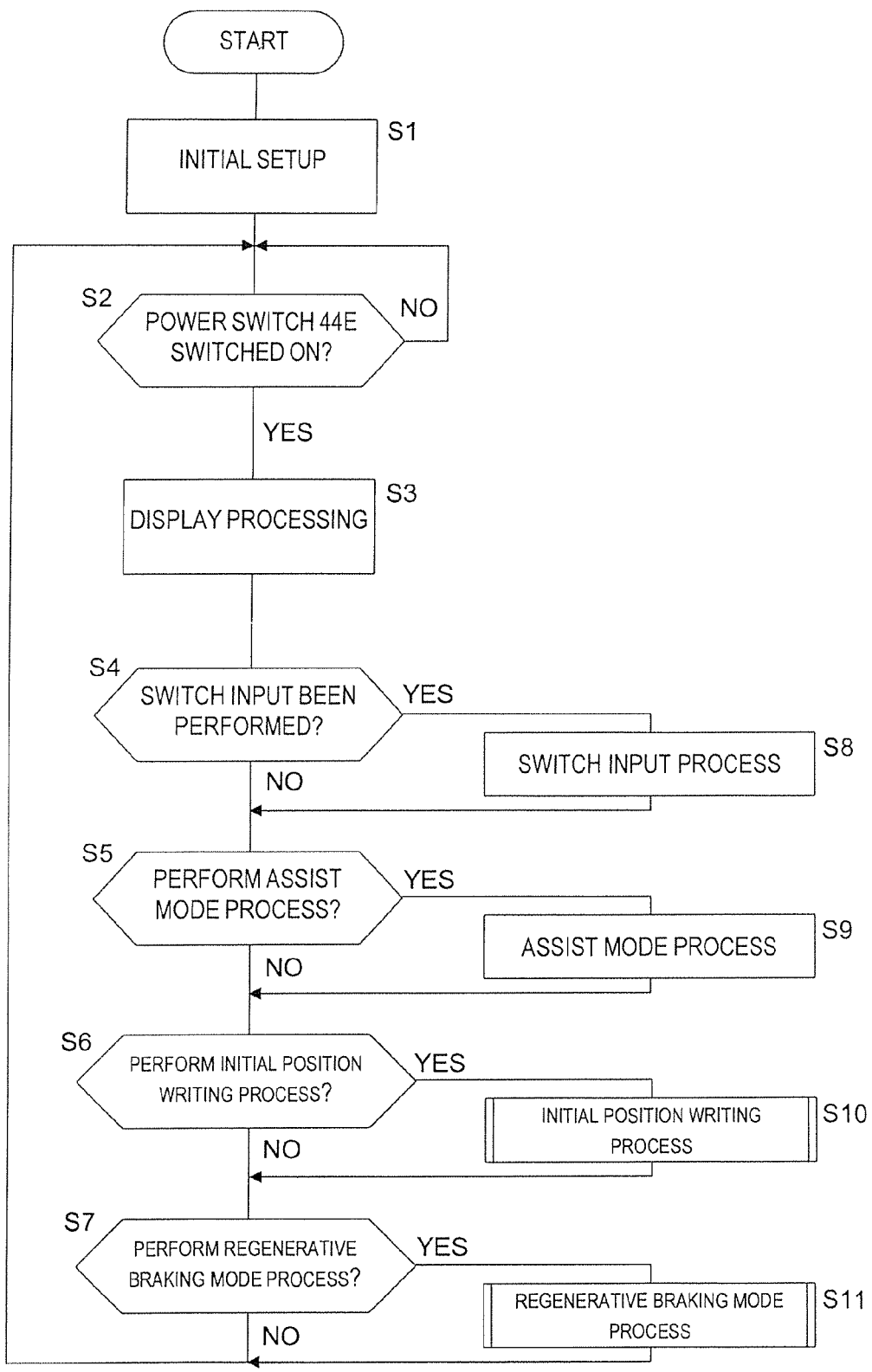
FIG. 8 is a flow chart showing a control operation executed by a regenerative braking control part of the bicycle regenerative brake control device.
Figure 9:
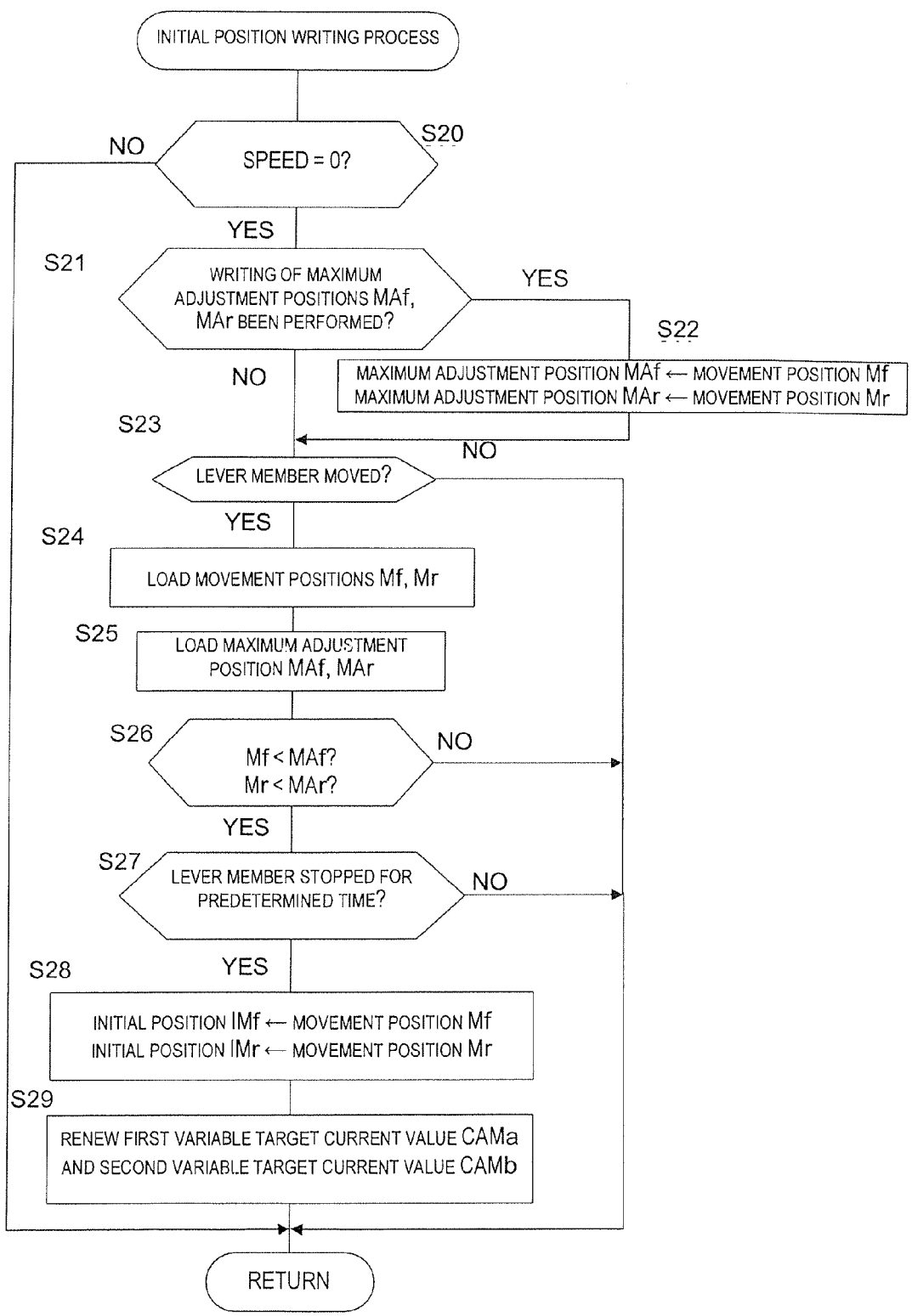
FIG. 9 is a flow chart showing an operation of an initial position rewriting part of the bicycle regenerative brake control device.
Figure 10:
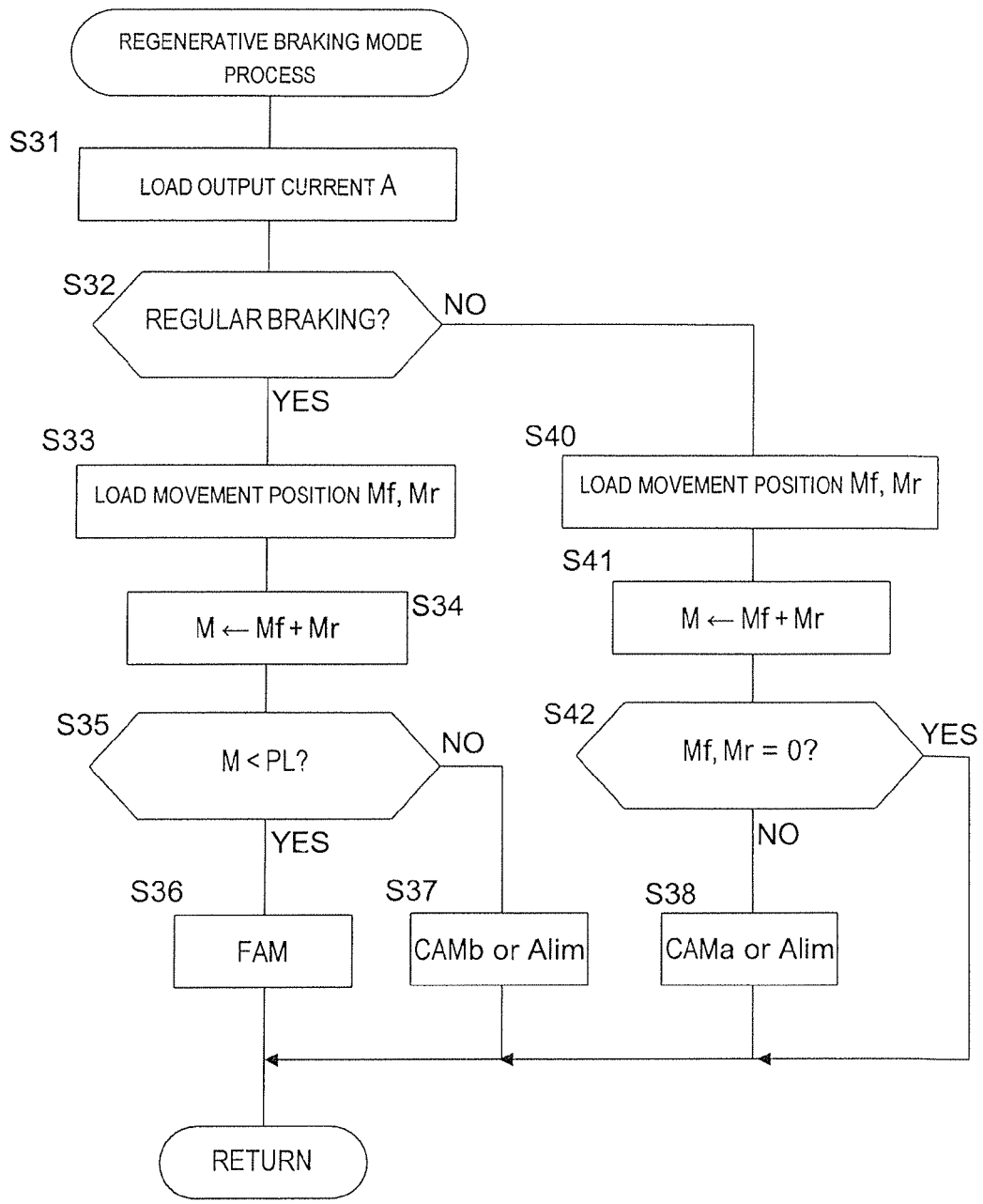
FIG. 10 is a flow chart showing a regenerative braking control operation executed by the bicycle regenerative brake control device.

Next, a control operation of the regenerative braking control part 74 will be described with reference to control flow charts shown in FIGS. 8 to 10. With regards to the control operation, the process shown in FIGS. 8 to 10 is an example of the control operation. In the flow charts shown in FIGS. 8 to 10, the words "left" and "right" are omitted from the initial position, the movement position and the maximum adjustment position of the right brake lever 16f and the left brake lever 16r; the letter "r" or "f" indicating left or right is affixed to the abbreviations representing each of the positions.

When electrical power from the power-storing part 14 is fed to the overall control part 12, the overall control part 12 launches the control operation.

Figure 4:
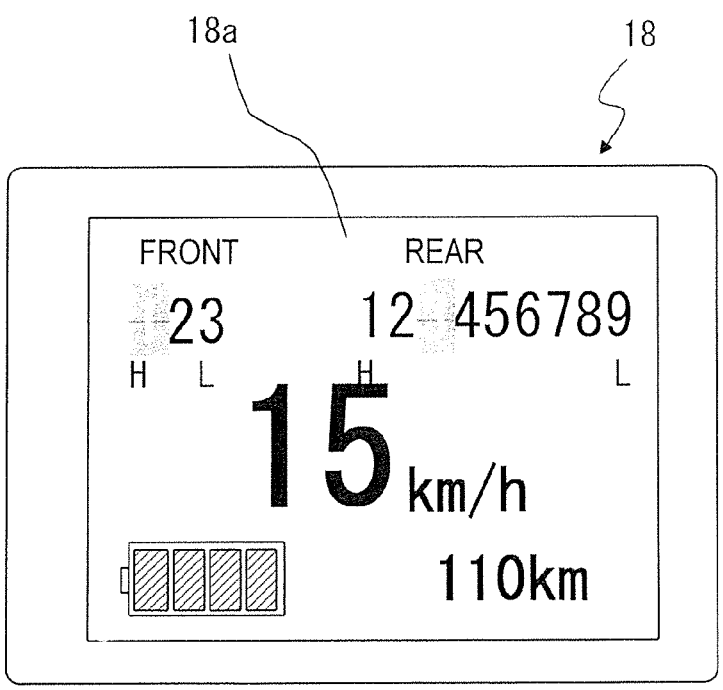
FIG. 4 is a diagrammatic drawing showing an example of a cycle computer screen being displayed on the display device.

In step S1 in FIG. 8, initial setup is performed. In the initial setup, a variety of variables and flags are reset. In step S2, the flow stands by for the power switch 44e to be switched on. When the power switch 44e is switched on, the control process proceeds to step S3. In step S3, the display on the display part 18 is processed. At this step, either the assist screen shown in FIG. 3 or the cycle computer screen shown in FIG. 4 is displayed according to operation of the display changeover switch 44b. A variety of display processes are also performed. Step S4 determines whether switch input has been performed. Step S5 determines whether to execute the assist mode. Step S6 determines whether the initial position has been modified and whether to perform the initial position writing process. Step S7 determines whether to perform the regenerative braking process, and the control process proceeds to step S2.

If it has been determined that switch input has been performed, the control process proceeds from step S4 to step S8. At step S8, a switch input process is performed, and the control process proceeds to step S5. In the switch input process, a process is performed according to the switch that has been operated. For example, in the assist screen shown in FIG. 3, when the up mode selection switch 44c is operated, a cursor displayed on either the three assist modes and the two regenerative braking modes displayed on the right side of the screen, or on the assist/regeneration off mode moves upwards by one step each time the up mode selection switch 44c is pressed. Also, when the down mode selection switch 44d is pressed, the cursor moves downwards by one step each time the switch is pressed. When a predetermined time (e.g., 2 to 5 seconds) has elapsed after the cursor has been moved, the assist mode and the regenerative braking mode that have been selected are set, and the cursor becomes fixed at the assist mode and the regenerative braking mode that have been set.

If it is determined that the assist mode is to be executed, the control process proceeds from step S5 to step S9. In step S9, an assist process is performed in the assist mode selected during the switch input process, and the control process proceeds to step S6. In the assist mode, the motor 60 generates an assist force according to an assist mode selected from "strong", "medium", or "weak;" and assists human-powered driving by the rider.

If it is determined that the initial position rewriting process is to be performed, the control process proceeds from step S6 to step S10. At step S10, an initial position rewriting process shown in FIG. 9 is performed, and the control process proceeds to step S7.

If it is determined that the regenerative braking process is to be performed, the control process proceeds from step S7 to step S11. At step S11, the regenerative braking mode process shown in FIG. 10 is performed, and the control process proceeds to step S2.

In the initial position rewriting process in step S10, it is determined in step S20 in FIG. 9, from an output from the speed sensor 62, whether the speed of the bicycle is "0". If the speed is not "0", the flow returns to the main routine shown in FIG. 8. If the speed is "0", the control process proceeds to step S21.

In step S21, it is determined whether the lever member 31 of at least one of the right brake lever 16f and the left brake lever 16r has been adjusted to the maximum adjustment position by the initial position adjusting part 50 and an operation for writing the maximum adjustment position has been performed. This determination is made by, e.g., simultaneous operation of the lamp switch 44a and the display changeover switch 44b. If the determination is "YES", the control process proceeds to step S12.

In step S22, the current right position of movement Mf of the lever member 31 detected by the linear Hall element 55 of the right brake lever 16f is written as the right maximum adjustment position MAf to the maximum adjustment position memory part 91, the current left movement position Mr of the lever member 31 detected by the linear Hall element 55 of the left brake lever 16r is written as the left maximum adjustment position MAr to the maximum adjustment position memory part 91, and the control process proceeds to step S23.

In step S23, it is determined whether the lever member 31 of at least one of the right brake lever 16f and the left brake lever 16r has moved. If, in step S23, it is determined that is has not moved, the flow returns to the main routine shown in FIG. 8. If, in step S23, it is determined that it has moved, the control process proceeds to step S24.

In step S24, in a case in which it has been determined in step S23 that the lever member 31 of the right brake lever 16f has moved, the right movement position Mf is read from the linear Hall element 55 of the right brake lever 16f, and the control process proceeds to step S25. Also, in step S24, in a case in which it has been determined in step S23 that the lever member 31 of the left brake lever 16r has moved, the left movement position Mr is read from the linear Hall element 55 of the left brake lever 16r, and the control process proceeds to step S25. Also, in step S24, in a case in which it has been determined in step S23 that the lever member 31 of each of the right brake lever 16f and the left brake lever 16r has moved, the right movement position Mf and the left movement position Mr are loaded from the linear Hall element 55 of each of the right brake lever 16f and the left brake lever 16r respectively, and the control process proceeds to step S25.

Alternatively, in step S24, in a case in which it has been determined in step S23 that the lever member 31 of one of the right brake lever 16f and the left brake lever 16r has moved, the right movement position Mf and the left movement position Mr may be loaded from the linear Hall element 55 of each of the right brake lever 16f and the left brake lever 16r respectively, where the flow then proceeds to step S25.

In step S25, in a case in which the right movement position Mf has been read in step S24, the right maximum adjustment position MAf is read from the maximum adjustment position memory part 91, and in a case in which the left movement position Mr has been loaded in step S24, the left maximum adjustment position MAr is read from the maximum adjustment position memory part 91. The flow then proceeds to step S26.

In step S26, in a case in which the right movement position Mf has been read in step S25, it is determined whether the right movement position Mf that has been read is smaller than the right maximum adjustment position MAf, i.e., whether the right movement position Mf relates to the initial position adjusting part 50 of the right brake lever 16f having been operated to adjust the initial position. Also, in step S26, in a case in which the left movement position Mr has been read in step S25, it is determined whether the left movement position Mr that has been read is smaller than the left maximum adjustment position MAr, i.e., whether the left movement position Mr relates to the initial position adjusting part 50 of the left brake lever 16r having been operated to adjust the initial position.

In a case in which it has been determined, in step S26, that the right movement position Mf is smaller than the maximum adjustment position MAf and relates to an operation of adjusting the initial position, or in a case in which it has been determined that the left movement position Mr is smaller than the maximum adjustment position MAr and relates to an operation of adjusting the initial position, the control process proceeds from step S26 to step S27.

In step S27, it is determined whether the lever member 31 has been stationary for a predetermined time (e.g., 2 seconds) or longer. This is a process for cancelling the movement position during adjustment. If the lever member 31 has not been stationary for the predetermined time, the flow returns to the main routine. If the lever member 31 has been stationary for the predetermined time or longer, the control process proceeds from step S27 to step S28.

In step S28, in a case in which the right movement position Mf has been read in step S24, this right movement position Mf is stored in the initial position memory part 92 as the right initial position IMf. Also, in step S28, in a case in which the left movement position Mr has been read in step S24, the left movement position Mr read in step S24 is stored in the initial position memory part 92 as the left initial position IMr. At least one of the right initial position IMf of the lever member 31 of the right brake lever 16f and the left initial position IMr of the lever member 31 of the left brake lever 16r is thereby modified in the brake regeneration mode. When step S28 is complete, the control process proceeds to step S29.

In step S29, the function f(M) of the first variable target current value CAMa and the second variable target current value CAMb is renewed so that only the initial position is modified and the upper limit added movement position Mlim is not modified, as shown in FIG. 12. In FIG. 12, the function f(M) of the first variable target current value CAMa and the second variable target current value CAMb is renewed to a function which has been compressed only in the horizontal axis direction.

In a case in which it has been determined, in step S26 described further above, that the right movement position Mf is greater than the maximum adjustment position MA or that the left movement position Mr is greater than the left maximum adjustment position MAr, the flow returns to the main routine shown in FIG. 8. In a case in which it has been determined the right movement position Mf is greater than the maximum adjustment position MA or that the left movement position Mr is greater than the left maximum adjustment position Mar, it can be determined that the right movement position Mf or the left movement position Mr relates to a regular braking operation.

In the regenerative braking mode process shown in step S11, the output current A of the motor 60 is loaded from the output current detecting part 61a in step S31 shown in FIG. 10, and the control process proceeds from step S31 to step S32. In step S32, it is determined whether the braking mode is set to the regular regeneration mode. In a case where the braking mode is the regular regeneration mode, the control process proceeds from step S32 to step S33.

In step S33, the right movement position Mf and the left movement position Mr are loaded from the linear Hall element 55 of the right brake sensor 53f and the left brake sensor 53r respectively. In step S34, the right movement position Mf and the left movement position Mr which have been read are added, and the added movement position M is calculated.

In step S35, it is determined whether either of the right movement position Mf or the left movement position Mr has exceeded the predetermined position PL, i.e., whether at least one of the right brake lever 16f and the left brake lever 16r has been operated beyond the allowance made for looseness. In a case in which the decision in step S35 is determined to be "No"; i.e., in a case in which it has been determined that the operated lever member 31 does not have a right movement position Mf or a left movement position Mr that has exceeded the predetermined position PL, the control process proceeds to step S36.

In step S36, feedback control is performed on the motor 60 so that the output current A becomes equal to the fixed target current value FAM, and the control process proceeds to the main routine.

In a case in which it has been determined, in step S35, that either of the right movement position Mf or the left movement position Mr of the operated lever member 31 has exceeded the predetermined position PL, the control process proceeds to step S37. In step S37, while the added movement position M is equal to or smaller than the upper limit added movement position Mlim, feedback control is performed on the motor 60 so that the output current A is equal to the second variable target current value CAMb at the added movement position M. When the added movement position M exceeds the upper limit added movement position Mlim, feedback control is performed on the motor 60 so that the output current A is equal to the maximum output current Alim. The control process then returns to the main routine.

Alternatively, in step S35, it may be determined whether the added movement position M has exceeded the predetermined position PL. In this case, if it was determined that the added movement position M has exceeded the predetermined position PL, the control process proceeds to step S36, and if it was determined that the added movement position M has not exceeded the predetermined position PL, the control process proceeds to step S37.

If the braking mode is determined to be brake regeneration mode rather than regular regeneration mode, the control process proceeds from step S32 to step S40. In step S40, the right movement position Mf and the left movement position Mr are loaded in the same manner as with step S33, and the control process proceeds to step S41. In step S41, in the same manner as with step S35, the added movement position M is calculated, and the control process proceeds to step S42.

In step S42, as with step S35, it is determined whether either of the right movement position Mf or the left movement position Mr has exceeded the predetermined position PL, i.e., whether at least one of the right brake lever 16f and the left brake lever 16r has been operated beyond the allowance made for looseness. In a case in which it has been determined in step S42 that neither the right movement position Mf, nor the left movement position Mr has exceeded the predetermined position PL, the flow returns to the main routine without regenerative braking being performed. In a case in which either of the right movement position Mf and the left movement position Mr exceeds the predetermined position PL, the control process proceeds to step S43. In step S43, while the added movement position M is equal to or smaller than the upper limit added movement position Mlim, feedback control is performed on the motor 60 so that the output current A is equal to the first variable target current value CAMa at the added movement position M. When the added movement position M exceeds the upper limit added movement position Mlim, feedback control is performed on the motor 60 so that the output current A is equal to the maximum output current Alim. The control process then returns to the main routine.

When the regular regeneration mode is enabled, regenerative braking is thereby performed by the second regenerative braking force BF2, which is at a preset level at all times, until the lever member 31 is operated from the initial position IM so as to exceed the predetermined position PL as shown by a thick line in FIG. 11. When the lever member 31 exceeds the predetermined position PL, regenerative braking is performed by the first regenerative braking force BF1, which becomes increasingly greater than the second regenerative braking force BF2 in correspondence with the added movement position M.

In contrast, when the brake regeneration mode is enabled, the first regenerative braking force BF1 gradually increases from zero.

When the front brake system 117f and the rear brake system 117r undergo displacement, regenerative braking is performed by the first regenerative braking force BF1, which corresponds with the added movement position M, which is the braking information obtained from the right movement position Mf and the left movement position Mr. Therefore, it is possible to vary the first regenerative braking force in correspondence with the displacement of the two mechanical brake systems, reducing the likelihood of discomfort occurring between regenerative braking and mechanical braking.

Although an embodiment of the present invention has been described above, the present invention is not limited in scope thereby. Rather, a variety of modifications are possible without departing from the scope of the invention. For example, as seen in FIGS. 1 and 2, the front and rear brake devices 107f and 107r are cable operated cantilever brakes that are operated with the swinging levers 16f and 16r, respectively. However, the first and second brake systems of the present invention are not limited to this arrangement. Rather, the present invention can be used with a wide variety of brake systems, e.g., a caliper brake, a cantilever brake, a hydraulic brake, a roller brake, etc. Thus, for example, the first brake system can be a brake system that includes at least one of a brake lever, a brake wire, a caliper brake, a cantilever brake, a hydraulic brake, a brake shoe, a brake pad and a roller brake. Likewise, for example, the second brake system can be a brake system that includes at least one of a brake lever, a brake wire, a caliper brake, a cantilever brake, a hydraulic brake, a brake shoe, a brake pad and a roller brake.

In the above embodiment, the curves representing the variable target current value are curves whose rate of increase falls in correspondence with increasing added movement position M. However, the configuration of the increase in the variable target current value is not limited to that shown in the above embodiment. The curves may be ones whose rate of increase grows in correspondence with the increase in the added movement position M, or ones whose rate of increase fluctuates. A straight line, whose rate of increase does not vary, is also possible. The variable target current value may also be configured so as to increase in increments in correspondence with increasing added movement position M.

The above embodiment discloses a brake mechanism comprising a brake lever and a brake device connected by a brake cable. However, this does not limit the scope of the present invention. For example, the present invention can be applied to a brake mechanism comprising a brake lever and a brake device connected by hydraulic piping or tubing. In a case in which hydraulic piping or tubing is used, the hydraulic pressure may be detected, and regenerative control performed according to the pressure. Also, in the above embodiments, regenerative control is performed according to the movement position of the lever part of the brake lever. However, regenerative control may also be performed according to the movement position of a brake shoe, and regenerative control may also be performed according to the movement position of a part of the brake cable.

In the above embodiment, the added movement position M, obtained by adding the right movement position Mf and the left movement position Mr of the respective lever member 31 of the front brake system 117f and the rear brake system 117r, is used as the braking information; and the first regenerative braking force is set according to the added movement position M. However, this does not limit the scope of the present invention. For example, the right movement position Mf and the left movement position Mr may be weighted differently, and the first regenerative braking force set according to braking information that takes the weighting into account. For example, the right movement position Mf and the left movement position Mr are weighted and added to obtain the braking information. A configuration is also possible in which the weighting of the right movement position Mf and the left movement position Mr can be modified using, e.g., the switches 44a through 44e.

In the above embodiment, the present invention was described using an example of a power-assisted bicycle in which a motor unit 10 is provided to the front wheel 106f. However, this does not limit the scope of the present invention. For example, the present invention can be applied to a power-assisted bicycle in which a motor unit is provided to the rear wheel 106r or the hanger part 122.

In the above embodiment, the movement position of the lever member is detected; however, this does not limit the scope of the present invention. For example, the first regenerative braking force may be varied in correspondence with the movement position of a brake shoe of a rim brake system, or the movement position of a brake pad or a brake shoe of a hub brake system.

In the above embodiment, the power-assisted bicycle is configured so as to have an externally installed shift transmission. However, a configuration in which an internally installed shift transmission is provided, or a configuration in which no shift transmission is provided, is also possible.

In the above embodiment, rewriting of the right initial position IMf and the left initial position IMr is performed using key input operation; however, this does not limit the scope of the present invention. The initial position rewriting part 80 may rewrite the content stored in the initial position memory part 92 with the current position when power is enabled. Specifically, when power is enabled, in a case in which the position detected by the linear Hall element 55 of the right brake lever 16f is smaller than the right maximum adjustment position MAf, the initial position rewriting part 80 stores this position in the initial position memory part 92 as the right initial position IMf, and rewrites the initial position. Also, when power is enabled, in a case in which the position detected by the linear Hall element 55 of the left brake lever 16r is smaller than the left maximum adjustment position Mar, the initial position rewriting part 80 stores this position in the initial position memory part 92 as the left initial position IMr, and rewrites the initial position. Rewriting of the initial position can thereby be performed automatically.

In the above embodiment, the overall control part 12 functions as the regenerative braking control part 74. However, a configuration is also possible in which a motor control part for controlling the motor is provided to the motor unit, wherein the motor control part and the overall control part 12 jointly deliver the function of the regenerative braking control part 74.

Thus, the foregoing descriptions of the embodiments according to the present invention are provided for illustration only, and not for the purpose of limiting the invention as defined by the appended claims and their equivalents.

What is claimed is:

1. A bicycle regenerative brake control device comprising:
   a first displacement amount detecting part that is arranged to detect a first displacement amount a first brake system;
   a second displacement amount detecting part that is arranged to detect a second displacement amount of a second brake system, which different from the first brake system; and
   a first control part that is configured to control a motor using a first control process in response to the first and second displacement amounts of the first and second brake systems such that the first control part generates a first regenerative braking force that corresponds with braking information obtained from the first displacement amount and the second displacement amount.

2. The bicycle regenerative brake control device according to claim 1, wherein
   the first control part is configured to obtain the braking information by adding the first displacement amount and the second displacement amount.

3. The bicycle regenerative brake control device according to claim 1, wherein
   the first control part is configured to control the motor such that the first control part generates the first regenerative braking force, which gradually increases in correspondence with an increase in the first and second displacement amounts.

4. The bicycle regenerative brake control device according to claim 2, wherein
   the first control part is configured to control the motor such that the first control part generates the first regenerative braking force, which gradually increases in correspondence with an increase in the first and second displacement amounts.

5. The bicycle regenerative brake control device according to claim 1, further comprising
   a second control part configured to control the motor using a second control process such that the second control part generates a second regenerative braking force of a preset level upon determining is no displacement in either of the first brake system or the second brake system.

6. The bicycle regenerative brake control device according to claim 5, further comprising
   a switch control part configured to switch from the second control process performed by the second control part to the first control process performed by the first control part upon determining at least one of the first and second brake systems undergoes displacement while the second control process is being performed by the second control part.

7. The bicycle regenerative brake control device according to claim 6, wherein
   the first control part generates the first regenerative braking force in a situation in which the switch control part switches from the second control process performed by the second control part to the first control process performed by the first control part, the first regenerative braking force being equal to or greater than the second regenerative braking force in correspondence with the braking information.

8. The bicycle regenerative brake control device according to claim 6, further comprising
a mode switch part configured to switch braking modes between a first regeneration mode and a second regeneration mode in response to a user input, the first regeneration mode using the second control process while no displacement is determined in either of the first and second brake systems and using the first control process while at least one of the first and second brake systems is determined to be undergoing displacement, and the second regeneration mode prohibiting use of the second control process and only using the first control process while at least one of the first and second brake systems is undergoing displacement.

9. The bicycle regenerative brake control device according to claim 1, wherein
the first control part controls the first regenerative braking force based on an output current of the motor that increases in correspondence with an increase in the first and second displacement amounts.

10. The bicycle regenerative brake control device according to claim 9, wherein
the first control part sets an upper limit of the first regenerative braking force based on a maximum output current that has been preset in advance.

11. The bicycle regenerative brake control device according to claim 2, further comprising
a second control part configured to control the motor using a second control process such that the second control part generates a second regenerative braking force of a preset level upon determining is no displacement in either of the first brake system or the second brake system.

12. The bicycle regenerative brake control device according to claim 3, further comprising
a second control part configured to control the motor using a second control process such that the second control part generates a second regenerative braking force of a preset level upon determining is no displacement in either of the first brake system or the second brake system.

13. The bicycle regenerative brake control device according to claim 1, wherein
the first control part is configured to generate the first regenerative braking force as a single regenerative braking force that corresponds with a combination of the braking information obtained from the first and second displacement amounts, and that any change in a value of the single regenerative braking force is caused by a change in the combination of the braking information.

* * * * *